United States Patent
Herbst et al.

(10) Patent No.: US 6,321,161 B1
(45) Date of Patent: Nov. 20, 2001

(54) METHOD AND SYSTEM FOR PROVIDING GUIDANCE ABOUT ALTERNATIVE ROUTES WITH A NAVIGATION SYSTEM

(75) Inventors: James Herbst, Chicago; Sue McGrath, Arlington Heights; Paul Bouzide, Chicago, all of IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/392,876

(22) Filed: Sep. 9, 1999

(51) Int. Cl.[7] ............................................... G06F 19/00
(52) U.S. Cl. ..................... 701/210; 701/200; 701/209; 701/117; 340/995; 340/905
(58) Field of Search ................................... 701/210, 200, 701/201, 207, 209, 213, 117; 340/995, 905

(56) References Cited

U.S. PATENT DOCUMENTS

| | | | |
|---|---|---|---|
| 5,428,545 | 6/1995 | Maegawa et al. | 364/444 |
| 5,787,383 | 7/1998 | Moroto et al. | 701/210 |
| 5,982,298 | 11/1999 | Lappenbusch et al. | 340/905 |
| 6,163,751 | * 12/2000 | Van Roekel | 701/210 |

* cited by examiner

Primary Examiner—William A. Cuchlinski, Jr.
Assistant Examiner—Arthur D. Donnelly
(74) Attorney, Agent, or Firm—Frank J. Kozak; Lawrence M. Kaplan (57) ABSTRACT

A feature for a navigation system provides an evaluation of alternative routes. According to this feature, the navigation system provides information to the vehicle driver about departing from a route being followed. This allows the driver to make an assessment whether to depart from the route being followed or stay on the route. This feature enables driver-observable traffic conditions to be taken into account by the vehicle driver.

35 Claims, 8 Drawing Sheets

FIG. 8

METHOD AND SYSTEM FOR PROVIDING GUIDANCE ABOUT ALTERNATIVE ROUTES WITH A NAVIGATION SYSTEM

BACKGROUND OF THE INVENTION

The present invention relates to in-vehicle navigation systems and more particularly the present invention relates to using a navigation system interactively to provide guidance about alternative routes while driving.

In-vehicle navigation systems are available that provide end users (such as drivers of the vehicles in which the in-vehicle navigation systems are installed) with various navigating functions and features. For example, some in-vehicle navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of instructions that identify the driving maneuvers required to be taken by the end user to travel from the starting location to the destination location. The instructions may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for improvements. One area in which there is room for improvement relates to using a navigation system to provide route guidance that takes into account driving or traffic conditions observed by the vehicle driver. For example, the driver may observe a traffic condition that may have an affect on how quickly a destination is reached. According to one example, the driver may observe that the road ahead along the calculated route is backed up with traffic congestion. According to another example, the driver may observe that a left turn signal in a stop light at an upcoming intersection would allow a left turn to be made sooner than proceeding straight ahead along a calculated route. Under these circumstances, the driver may not be satisfied with staying on the calculated route because conditions that the driver observes may suggest that an alternative route may be faster. However, prior navigation systems have not provided a way to take driver-observable conditions into account.

It is noted that some in-vehicle navigation systems have been proposed that obtain and use real-time traffic information. According to one type of proposed system, data about traffic congestion in a geographic area are collected by a traffic information service. The collected traffic data are filtered and processed. Then, the traffic information service broadcasts messages that contain information about the traffic congestion along roads in the geographic area. The in-navigation systems in the vehicles traveling in the geographic area include equipment that receive the messages. Programming in the in-vehicle navigation systems use the information about traffic congestion when calculating optimal routes and when providing route guidance.

Although these types of proposed systems can be beneficial to vehicle users, these types of systems rely on the collection and broadcasting of traffic congestion information by a traffic information service. Many geographic regions may not have a traffic information service that collects traffic data and broadcasts messages that can be used by in-vehicle navigation systems. Further, even if a traffic information service is available in a geographic area, the traffic information service may collect and broadcast traffic congestion data about only certain roads (e.g., those that have the highest volume of traffic). If the driver of the vehicle with the in-vehicle navigation system is traveling on a road that is not covered by the traffic information service, he/she may not be able to obtain up-to-date traffic information.

Accordingly, there continues to be a need to provide alternative ways to provide navigation assistance to a vehicle driver using a navigation system.

SUMMARY OF THE INVENTION

To address these and other objectives, the present invention comprises a feature for a navigation system that provides an evaluation of alternative routes. According to this feature, the navigation system provides information to the vehicle driver about departing from a route being followed. This allows the driver to make an assessment whether to depart from the route being followed or stay on the route. This feature enables driver-observable traffic conditions to be taken into account by the vehicle driver.

DETAILED DESCRIPTION OF THE PRESENTLY PREFERRED EMBODIMENTS

I. OVERVIEW OF NAVIGATION SYSTEM

Figure 1:
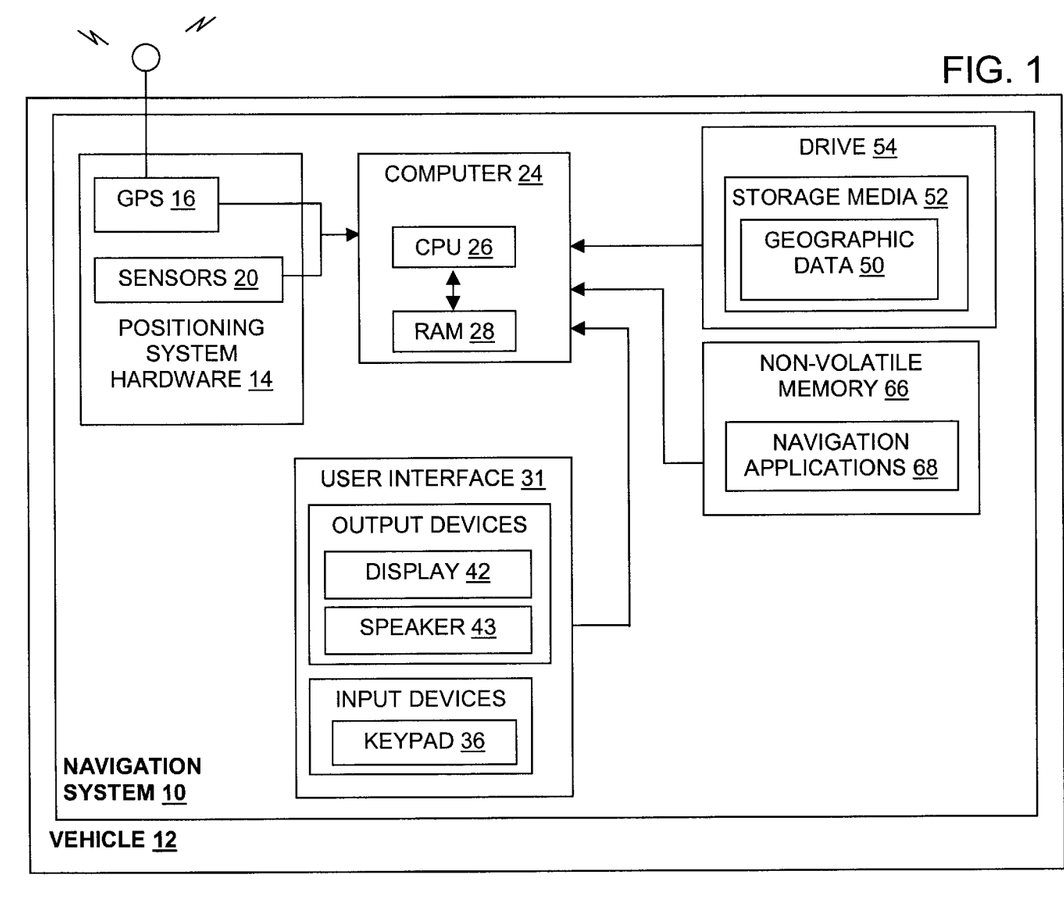
FIG. 1 is a block diagram showing components of an exemplary navigation system used in conjunction with a first embodiment.

Referring to FIG. 1, there is a diagram illustrating an exemplary configuration of a navigation system 10. The navigation system 10 is a combination of hardware and software components. In one embodiment, the navigation system 10 is located in an automobile 12. The navigation system 10 includes appropriate positioning system hardware 14 which in an exemplary embodiment may include a GPS system 16 and other sensor equipment 20 that senses the vehicle speed, heading, acceleration, etc. In addition, the navigation system 10 includes an appropriate computer 24, including a CPU 26 and memory 28 as well as other appropriate hardware.

Figure 2:
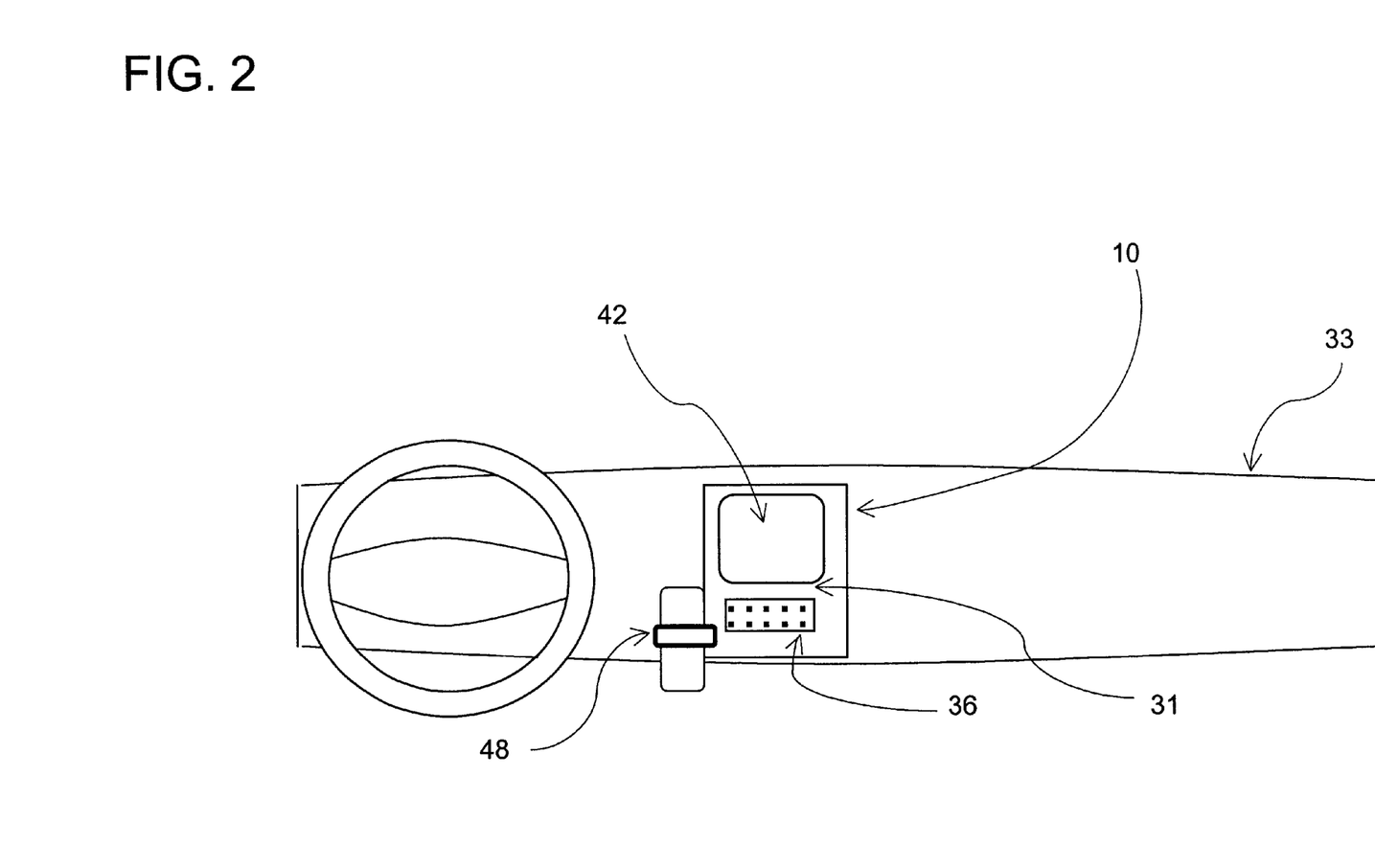
FIG. 2 is an illustration of a vehicle dashboard in which the navigation system of FIG. 1 is installed.

Also included as part of the navigation system 10 is a user interface 31 coupled to the computer 24. The user interface 31 includes appropriate means for receiving instructions and input from a user as well as means for providing information back to the user. FIG. 2 shows parts of the user interface 31. In FIG. 2, the navigation system 10 is shown installed in a dashboard 33 of the vehicle 12. The user interface 31 is installed on a front panel of the navigation system 10 so that it is accessible to the driver and/or passengers. The user interface 31 includes an input keypad 36 and possibly other input hardware and software, such as a microphone, voice recognition software, and so on, through which the driver (or passenger) can request navigation information and services. The user interface 31 may also include output hardware and software, such as a display screen 42, speakers 43 (shown in FIG. 1), speech synthesis software, etc., through which the driver or passengers can be provided with information from the navigation system 10. The user interface 31 may also include a remote control unit 48 mounted in a bracket located on a front panel of the navigation system 10. The remote control unit 48 may include its own input keys and possibly a display screen.

Referring again to FIG. 1, all of the components described above may be conventional (or other than conventional) and the manufacture and use of these components are known to those of skill in the art. For example, the processor 26 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

In order to provide navigation features to an end user, the navigation system 10 uses geographic data 50. The geographic data 50 includes information about one or more geographic regions or coverage areas. The geographic data 50 may be stored in the vehicle 12 or alternatively, the geographic data 50 may be stored remotely and made available to the navigation system 10 in the vehicle 12 through a wireless communication system which may be part of the navigation system 10. In another alternative, a portion of the geographic data 50 may be stored in the vehicle 12 and a portion of the geographic data 50 may be stored in a remote location and made available to the navigation system 10 in the vehicle 12 over a wireless communication system from the remote location.

In the embodiment shown in FIG. 1, some or all of the geographic data 50 are stored on a medium 52 which is located in the vehicle 12. Accordingly, the navigation system 10 includes a drive 54 (or other suitable peripheral device) into which the medium 52 can be installed and accessed. In one embodiment, the storage medium 52 is a CD-ROM disk. In another alternative embodiment, the storage medium 52 may be a PCMCIA card in which case the drive 54 would be substituted with a PCMCIA slot. Various other storage media may be used, including fixed or hard disks, DVD disks or other currently available storage media, as well as storage media that may be developed in the future.

The geographic data 50 may be stored in the form of one or more computer-readable data files or databases. The geographic data 50 may include information about the positions of roads and intersections in or related to a specific geographic region or area, and may also include information about one-way streets, turn restrictions, street addresses, cost of travel factors (i.e., relative times associated with travel along various road segments), alternative routes, hotels, restaurants, museums, stadiums, offices, automobile dealerships, auto repair shops, etc. The geographic data 50 may take a variety of different forms. The geographic data 50 include data entities corresponding to "segments" and "nodes." A "segment" is a data entity that represents a portion of a navigable roadway in the geographic region and a "node" is a data entity that represents a point in the geographic region. A "segment" has two "nodes" associated with it, one at each end.

In one embodiment, the geographic data are developed and provided by Navigation Technologies Corporation of Rosemont, Ill., however it is understood that data developed and provided by other entities may also be suitable for use with the inventive subject matter disclosed herein.

II. THE NAVIGATION PROGRAMMING

The navigation system 10 may include another storage device 66 (or ROM) which is used to store navigation programming 68. Alternatively, the geographic data 50 and the navigation programming 68 may be provided on a single storage device or medium. The navigation programming 68 may include separate applications (or subprograms). These applications provide various navigation-related features to the user of the navigation system 10. These features may include route calculation, route guidance (wherein detailed directions are provided for reaching a desired destination), map display, vehicle positioning (e.g., map matching), and so on. The navigation applications may be written in a suitable computer programming language such as C, C++, Java, Visual Basic, etc.

During a typical use of the navigation system 10 of FIG. 1, some or all the applications included in the navigation programming 68 are loaded from the ROM 66 into the memory 28 associated with the processor 26. The computer 24 receives input from the user interface 31. The input may include a request for navigation-related information. Information is obtained from the positioning system hardware 14 indicating a position of the vehicle 12. The information from the positioning system hardware 14 may be used by the navigation programming 68 that is run on the processor 26 to determine the location, direction, speed, etc., of the navigation system 10, and hence the vehicle. The navigation programming 68 uses the geographic data 50 stored on the storage medium 52, possibly in conjunction with the outputs from the positioning system hardware 14, to provide various navigation-related functions and features. The features provided by these navigation applications are provided to the user (e.g., the vehicle driver) by means of the user interface 31.

Figure 3:
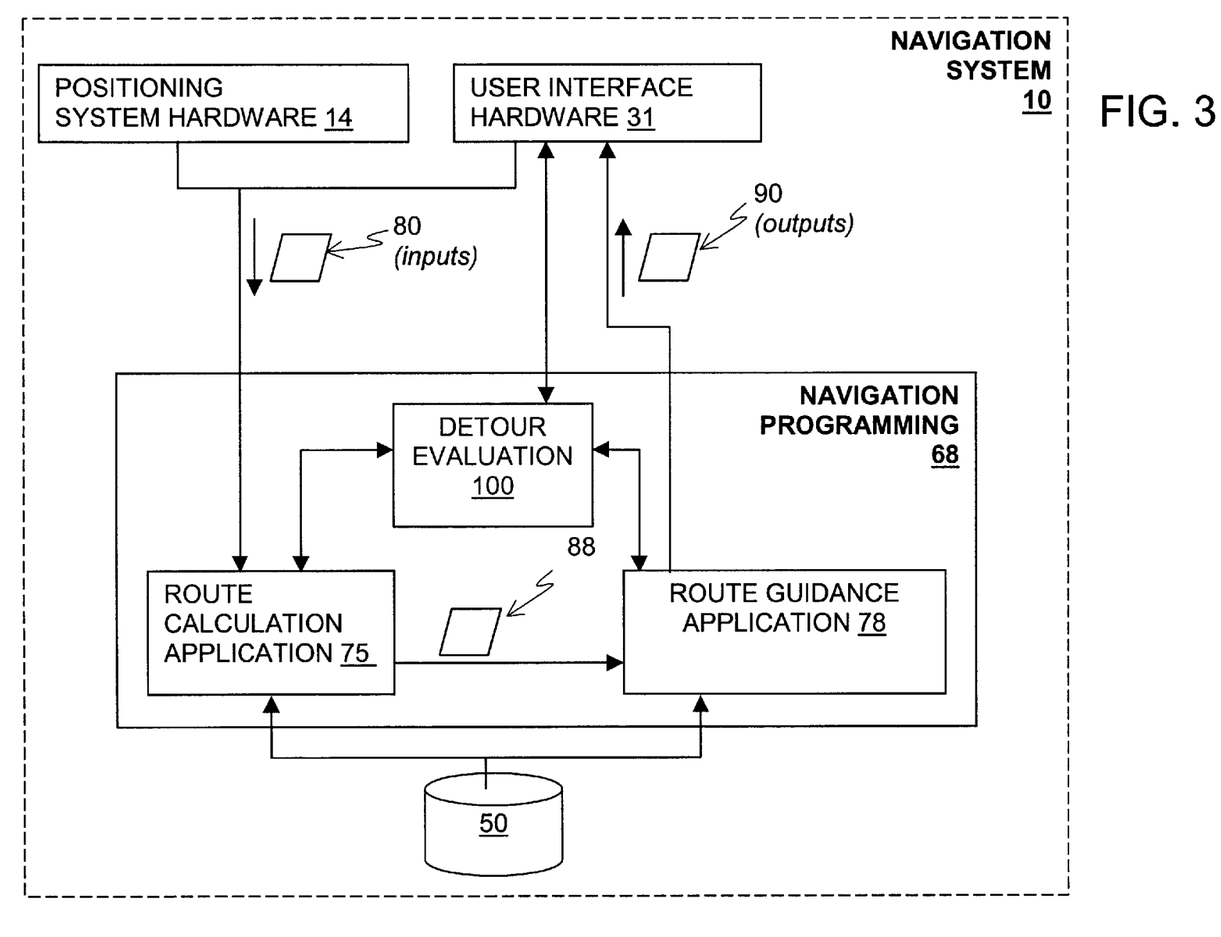
FIG. 3 is a block diagram showing portions of the navigation application programming in FIG. 1.

FIG. 3 is block diagram representing a portion of the navigation programming 68. The portion of the navigation programming 68 shown in FIG. 3 includes a route calculation application 75 and a route guidance application 78. The route calculation application 75 calculates a route from an origin location to a destination location. The route guidance application 78 provides instructions to the vehicle driver for following the route calculated by the route calculation application 75. In FIG. 3, the route calculation application 75 receives inputs 80. The inputs 80 are derived from the positioning system hardware 14 and/or user interface 31 (shown in FIGS. 1 and 2).

The inputs 80 include identifications of an origin and destination. Using these inputs 80, the route calculation application 75 calculates a route from the origin to the destination. The route calculation application 75 may use any of various means or algorithms for this purpose. For example, the route calculation application 75 may use either the A* algorithm or the Dykstra algorithm. Methods for calculating routes are disclosed in Ser. No. 08/893,201, filed Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. A suitable route calculation method now known or developed in the future may be employed.)

Regardless of the method used, the objective of the route calculation application 75 is to develop a list identifying a continuous series of road segments that form a legally valid solution route between the origin and destination. (A "legally valid solution route" conforms to known traffic restrictions, such as one way streets, turn restrictions, etc.) The method used by the route calculation application 75 may be designed to optimize the solution route to meet one or more predetermined criteria. Such criteria may include the least travel time, the shortest distance, the fewest turns, most scenic, etc. If the method used by the route calculation application 75 is designed to find a solution route that is optimized for one or more criteria, then the solution route also ideally meets these one or more criteria. After the route calculation application 75 has found a solution route, an output 88 is provided to the route guidance application 78.

Figure 4:
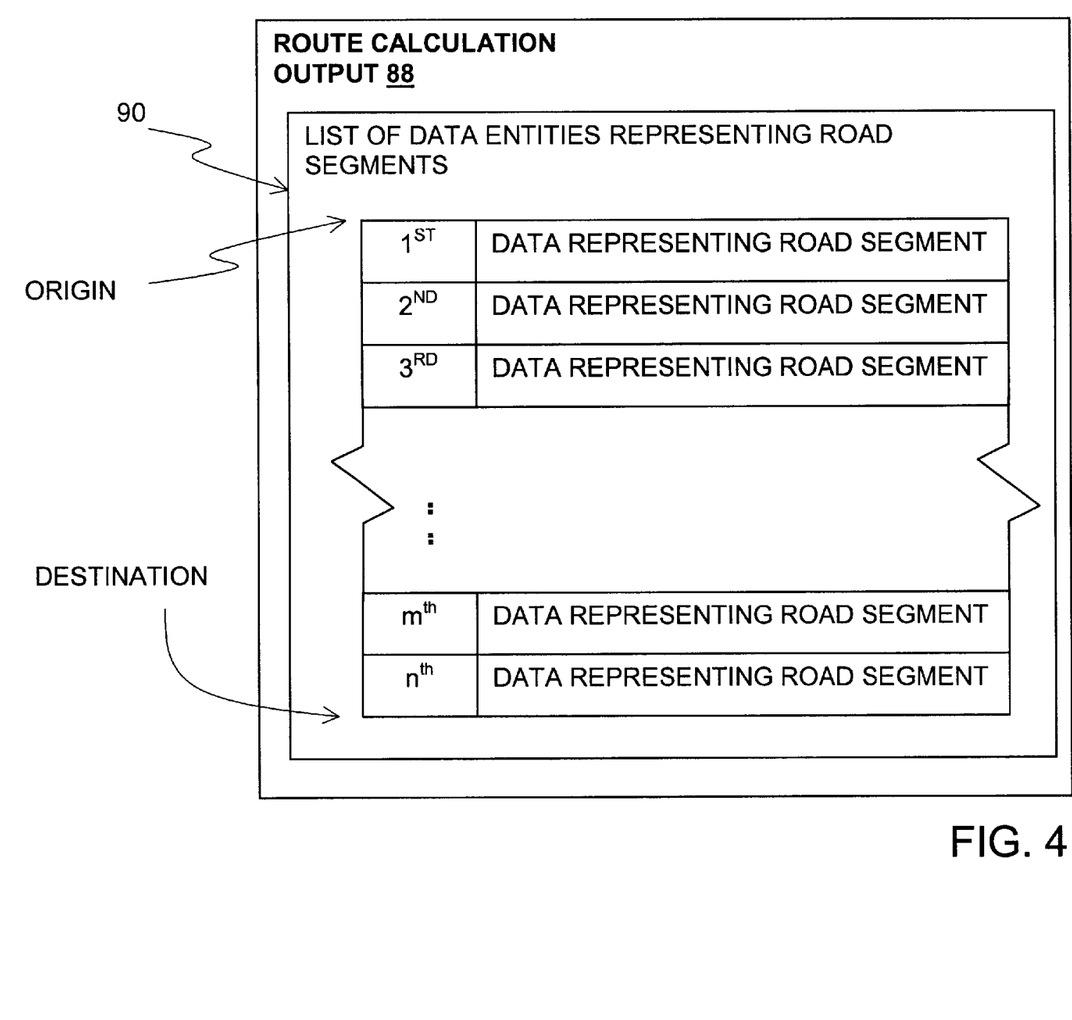
FIG. 4 is a block diagram showing some of the components of the output of the route calculation application of FIG. 3.

FIG. 4 is a diagram representing the components of the output 88 of the route calculation application 75. The route calculation output 88 contains an ordered list 90. Each entry in the ordered list 90 identifies a road segment in the solution route. Each road segment that forms part of the solution route between the origin and the destination may be identified by a data entity that represents the road segment.

Referring again to FIG. 3, using the data in the output 88 of the route calculation application 75, the route guidance application 78 forms instructions 90 to be provided to the vehicle driver to follow the calculated route to the destination. The instructions 90 may be provided to the vehicle driver via the user interface 31. The instructions 90 may be provided as audible instructions using the speaker 43 of the user interface 31. The instructions may be provided visually as text, symbols, maps, graphical displays, and so on, using the display screen 42 of the user interface 31.

III. DETOUR EVALUATION FEATURE

A. First Embodiment

Although navigation systems can provide numerous advantages to drivers, prior navigation systems have not provided a means to incorporate an available and potentially very useful source of navigation-related information, namely driver-observable conditions. Accordingly, a present embodiment provides a means by which driver-observable conditions can be incorporated into the guidance provided by a navigation system.

The driver-observable conditions may include any kinds of conditions. For example, the driver-observable conditions may include traffic congestion conditions, scenic conditions, road surface conditions, road construction conditions, road size conditions, or any other types of conditions. The driver-observable conditions may also include whether an upcoming traffic signal would allow one maneuver (e.g., a left turn) sooner than another maneuver (e.g., proceeding straight).

In a first embodiment, the navigation system 10 includes a detour evaluation feature. The detour evaluation feature is provided by programming in the navigation system 10. Referring to FIG. 3, the detour evaluation feature may be provided as a separate application 100 in the navigation programming 68. Alternatively, the detour evaluation feature may be provided as part of another application, such as the route calculation application 75 or the route guidance application 78. The detour evaluation feature 100 uses portions of the route calculation application 75 and the route guidance application 78. The detour evaluation feature 100 also receives input from and provides output to the user interface 31.

Figure 5:
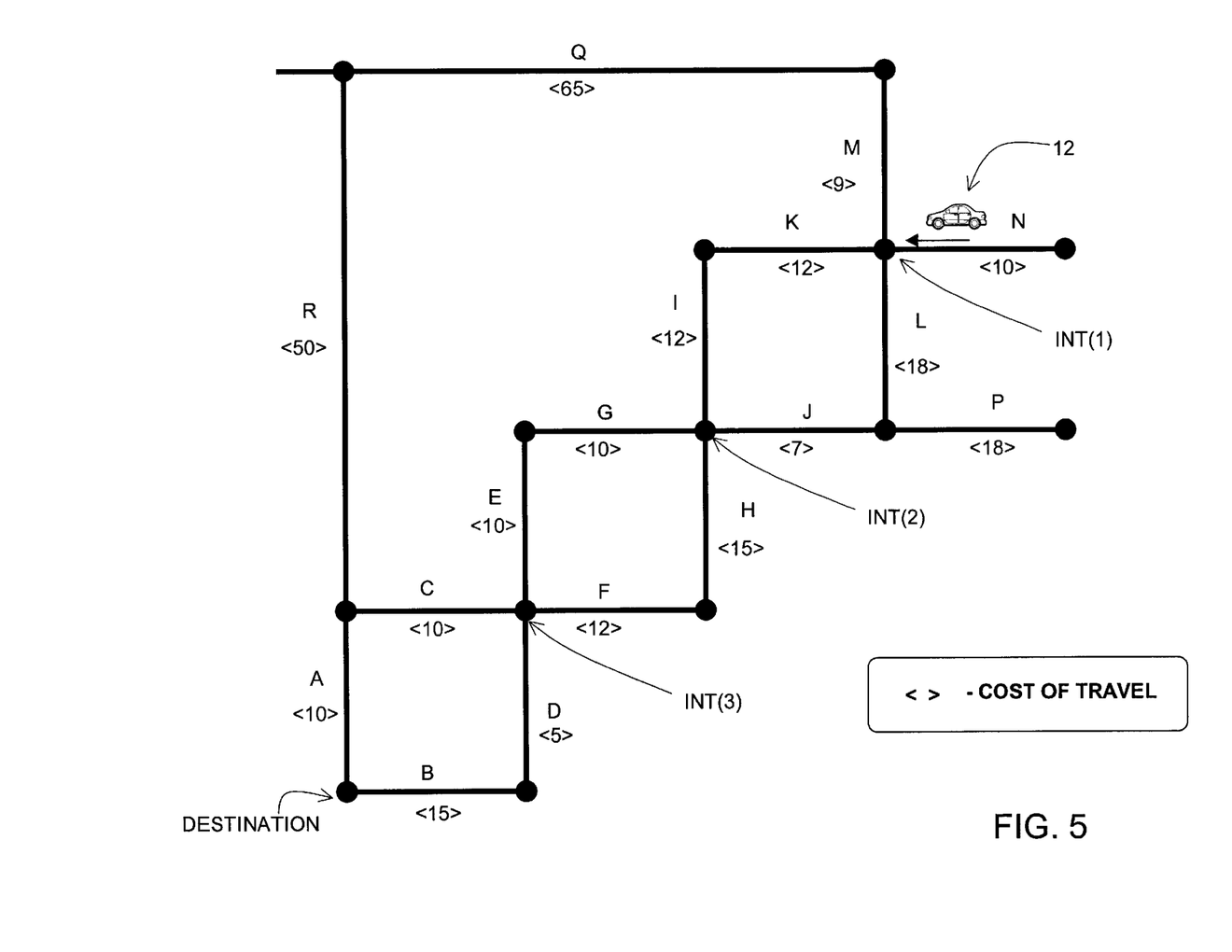
FIG. 5 is a map used to describe operation of an embodiment of the detour evaluation feature shown in FIG. 3.

The detour evaluation feature 100 is described in connection with FIGS. 5–8. In FIG. 5, the vehicle 12 with the navigation system 10 is shown following a solution route calculated by the navigation system 10. The vehicle 12 is traveling along a road segment, labeled "N", which is part the solution route calculated by the navigation system 10. The solution route calculated by the navigation system 10 leads to a destination, labeled as such in FIG. 5. The solution route to the destination includes the segments labeled N, K, I, G, E, D, and B. (The solution route may also include other road segments that the vehicle has already passed.)

In FIG. 5, the vehicle 12 is shown on the road segment labeled "N" approaching the intersection labeled "INT(1)." As the vehicle approaches the intersection INT(1), the route guidance feature (78 in FIG. 3) of the navigation system 10 may provide the driver with instructions to proceed straight through the intersection INT(1) to the road segment labeled "K", (observing all applicable traffic laws, of course). According to this embodiment, driver-observable conditions may be taken into account by the navigation system. For example, suppose that as the vehicle approaches the intersection, INT(1), the driver observes that the traffic straight ahead on the road segment labeled, "K" is congested. The driver may also observe that the traffic is not as congested on the other segments, labeled "M" and "L", that lead from the intersection INT(1). When presented with these observations, the driver desires to be advised by the navigation system about deviating from the calculated route at the upcoming intersection. According to one embodiment, the detour evaluation feature 100 of the navigation system can by used by the driver to be advised about deviating from the calculated route.

The detour evaluation feature 100 may be operated in several different modes. In one mode of operation, the detour evaluation feature operates automatically to evaluate each upcoming intersection as the vehicle is being driven. In another alternative mode of operation, the detour evaluation feature is configured to evaluate only upcoming major intersections, wherein the type of intersection defined as a major intersection may be configured by the end user, e.g., only intersections of main business arteries. In another alternative mode of operation, the detour evaluation feature can be operated to evaluate only a single selected upcoming intersection at a time.

Figure 6:
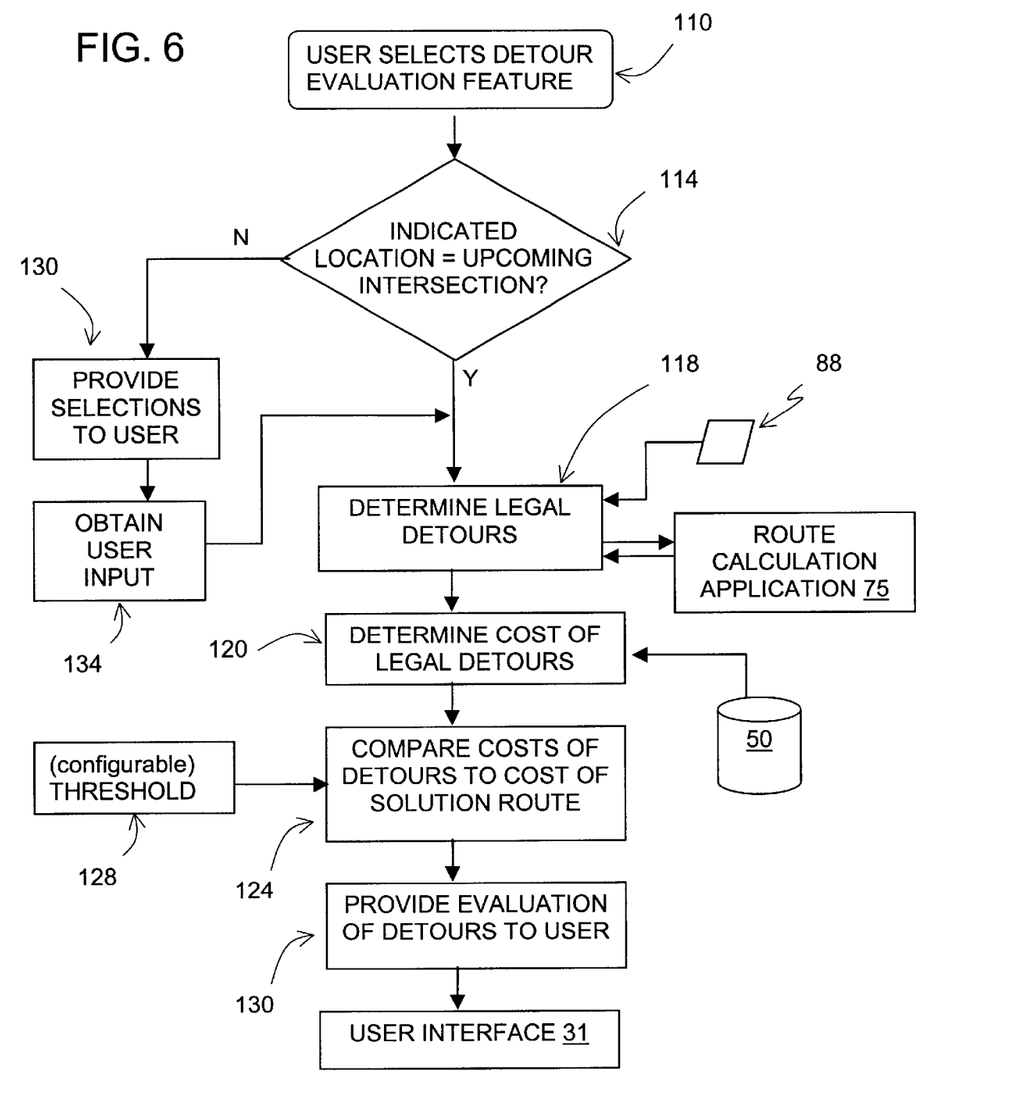
FIG. 6 is a flow chart showing steps performed by the embodiment of the detour evaluation feature shown in FIG. 3.

FIG. 6 is a flow chart showing the mode of operation of the detour evaluation feature 100 wherein a single intersection is evaluated. According to this mode of operation, the driver selects the detour evaluation feature 100 using the user interface 31 of the navigation system 10 (Step 110). The driver may select the detour evaluation feature 100 by operating the input device keypad 36 or other manual input device of the user interface to select the detour evaluation feature 100 from an appropriate menu presented on the display 42 of the user interface 31. Alternatively, the detour evaluation feature 100 may be activated by the driver using voice commands if supported by the user interface 31.

When selected by the driver, the detour evaluation feature 100 evaluates deviating from the calculated route at an indicated location. In one embodiment, the indicated location is the upcoming intersection by default (Step 114 in FIG. 6). In the example of FIG. 5, the upcoming intersection is the intersection labeled "INT(1)." (In alternative embodiments, described below, the indicated location may be a location other than the upcoming intersection.)

When evaluating deviations from the calculated route, the detour evaluation feature 100 first determines which of the possible deviations from the calculated route at the indicated location are legally valid (Step 118 in FIG. 6). When performing this step, the detour evaluation feature 100 checks whether there are any turn restrictions at the upcoming intersection or whether any of the roads that meet at the upcoming intersection have a restricted direction of travel (e.g., are one-way streets) onto which travel is legally prohibited from the road segment on which the vehicle is currently located. Any road onto which travel is legally prohibited is eliminated from consideration as a possible detour from the calculated route.

The detour evaluation feature 100 evaluates each of the possible legal deviations from the calculated route at INT(1). Each of these possible deviations from the calculated route is evaluated relative to the calculated route 88. The evaluation process performed by the detour evaluation function 100 is similar to the process used in the route calculation application 75 when calculating a solution route. (In one embodiment, the evaluation process may call functions in the route calculation application 75 to perform the evaluation.)

When calculating a route, the route calculation application 75 uses a cost of travel factor associated with each road segment and intersection. In the geographic database 50, each represented road segment is associated with a cost of travel factor and/or each represented intersection is associated with a cost of travel factor. The cost of travel factor is a value that indicates the relative cost (e.g., in time) to traverse the segment or intersection. In FIG. 5, the cost of travel for each depicted road segment is indicated in the angle brackets next to the road segment. In general, the higher the cost, the greater the amount of time to traverse the segment. (For simplicity, the cost of travel factors for the intersections are not shown. However, each intersection may have a cost of travel factor associated with each possible traversal of the intersection.)

The value of the cost of travel factor for a road segment (or an intersection) may be determined based upon various considerations, such as the speed limit along the road segment, stop signs or other traffic restrictions along the road segment, etc. The value of the cost of travel factor associated with a road segment in the geographic database is an average value for the road segment and does not necessarily take into account out of the ordinary conditions. For example, the value of the cost of travel factor would not take into account traffic congestion caused by an accident. The value of the cost of travel factor may not take into account rush hour traffic conditions.

According to one embodiment, when calculating a solution route, the route calculation application 75 generally chooses road segments that have the lowest cost of travel. (In alternative embodiments, other criteria may be used in addition to or instead of the cost of travel).

As stated above, when selected by the driver, the detour evaluation feature 100 evaluates deviations from the calculated route at an indicated location. When the detour evaluation feature 100 is selected as the vehicle approaches the intersection labeled INT(1), the detour evaluation feature evaluates each legal deviation from the solution route at the upcoming intersection, INT(1). In the example of FIG. 5, there are two deviations from the calculated route at the intersection labeled INT(1). The two deviations include turning right onto the segment labeled "M" and turning left onto the segment labeled "L". In order to evaluate these two deviations, the detour evaluation feature 100 first determines the sums of the costs of travel associated with each of these deviations (Step 120 in FIG. 6). For the deviation onto "L", the total cost of travel includes the individual costs associated with the segments labeled L, J, G, E, D, and B. These individual costs are 18, 7, 10, 10, 5, and 15, respectively, which sum to 65. For the deviation onto the segment labeled "M", the cost of travel includes the individual costs associated with the segments labeled M, Q, R, and A. These individual costs are 9, 65, 50, and 10, respectively, which sum to 134. The total cost of travel associated with staying on the solution route is also obtained. As stated above, the remaining segments in the solution route include the segments labeled K, I, G, E, D, and B. The individual costs of these segments are 12, 12, 10, 10, 5, and 15, respectively, which sum to 64.

Once these total costs of travel are determined, the total cost of travel of each deviation from the solution route is compared to the total cost of travel of the remaining segments in the solution route (Step 124 in FIG. 6). In the example of FIG. 5, the total cost of travel of the deviation of turning right, i.e., 134, is compared to the total cost of travel of remaining on the solution route, i.e., 64. Likewise, the total cost of travel of the deviation of turning left, i.e., 65, is compared to the total cost of travel of remaining on the solution route, i.e., 64. Using these comparisons, the detour evaluation function 100 provides one or more evaluations to the driver.

Different kinds of evaluations can be provided by the detour evaluation feature 100. In one embodiment, the evaluation provided by the detour evaluation feature 100 is an indication not to make a deviation at an indicated location. When the detour evaluation feature 100 provides an indication not to make a deviation, a threshold factor 128 may be used with the comparisons made between the deviations and the solution route. For example, a threshold factor of 25% may be used. Using a threshold factor of 25%, if the deviation has a cost of travel that is greater than 125% of the cost of travel of the solution route, the detour evaluation feature 100 provides an indication to the driver not to make the deviation. In the example of FIG. 5, making a right turn has a cost of travel of 134 compared to a cost of travel of the solution route of 64. The cost of travel of the right turn deviation is 209% of the cost of travel of the solution route ($^{134}/_{64}=209\%$). Therefore, since this value exceeds 125%, the detour evaluation feature 100 provides an indication to the driver not to take the deviation.

On the other hand, making a left turn has a cost of travel of 65 compared to a cost of travel of the solution route of 64. The cost of travel of the left turn deviation is 106% of the cost of travel of the solution route ($^{65}/_{64}=106\%$). Therefore, since this value is less than 125%, the detour evaluation feature 100 does not indicate to the driver to avoid the left turn deviation.

In one embodiment, the threshold factor 128 is configurable by the end user. A setup program included in the programming 68 may be used for this purpose. The end user may be able to access a menu on the display from which a value for the threshold may be selected. For example, the threshold factor may be set by the end user at 10%, 50%, 100%, and so on.

Figure 7:
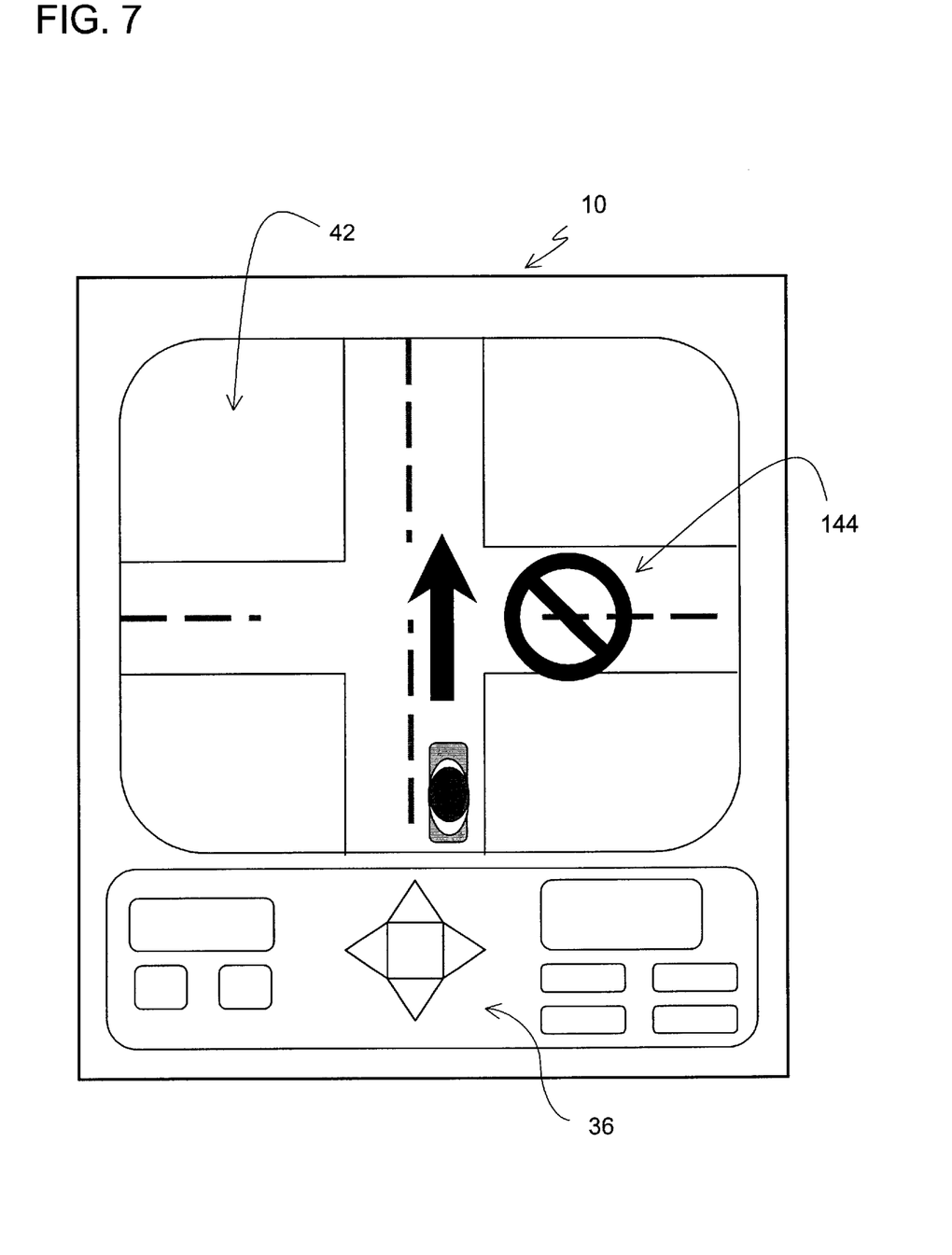
FIG. 7 is an illustration of the display screen of the navigation system of FIG. 2 during operation of the embodiment of the detour evaluation feature of FIG. 3.

After applying the threshold factor to the comparisons of the deviations to the solution route, the detour evaluation feature 100 provides an evaluation result to the end user (Step 130 in FIG. 6). In one embodiment the evaluation result is an indication. The indication can be expressed as text (e.g., "DON'T TURN RIGHT AT THE UPCOMING INTERSECTION") or a graphical display on the display screen 42 (in FIG. 1) or an audio message conveyed over the speaker 43 (in FIG. 1). One example of a graphical display showing an indication 144 not to make a right turn at an intersection being approached is shown in FIG. 7.

Referring again to FIG. 5, the driver may choose to stay on the solution route. If he/she does, the vehicle is driven onto the segment labeled "K." The detour evaluation feature 100 may be operated again as the vehicle approaches the next location at which a deviation from the solution route can be made. This next location is the intersection labeled, "INT(2)." At the intersection labeled INT(2), the solution route calls for making a right turn onto the segment labeled "G." The detour evaluation feature 100 would have only one deviation to evaluate at INT(2), i.e., proceeding straight onto the segment labeled "H." Assuming that travel onto "H" from "I" is legal, the detour evaluation feature 100 determines the cost of detouring onto "H" versus the cost of staying on the solution route by turning right onto "G." In this case, the deviation onto "H" has a total cost of 42 and the remaining portion of the solution route has a total cost of 40. Using the threshold factor of 25%, the detour evaluation feature 100 provides an indication to the end user that deviating from the solution route by proceeding onto "H" is not substantially worse than following the solution route onto "G."

B. Evaluating Other Locations Along Solution Route.

As mentioned above, in one embodiment the indicated location at which the detour evaluation feature 100 evaluates a deviation from the calculated route is by default the immediate location ahead along the solution route at which a departure from the solution route can be made. In many cases, this location will be an upcoming intersection. In alternative embodiments, the driver may select a different location from which deviations are evaluated.

To allow the end user to select a different location at which to evaluate a deviation from the solution route, the detour evaluation feature 100 presents menu screens from which the end user can select a location other than the upcoming intersection. In one embodiment, the detour evaluation feature 100 presents each location at which a deviation from the solution route can be made starting with the intersection immediately ahead of the vehicle on the solution route and proceeding one at a time to each subsequent location along the solution route at which a deviation from the solution route can be made (Step 130 in FIG. 6). Each location may be presented to the user in a graphical form. The display screen would include an indication of a key to press on the user interface to have an evaluation made of the deviations from the solution route at the displayed intersection. The display screen would also include an indication of another key to press to scroll to another display screen that illustrates the next location along the solution route at which a deviation from the solution route can be made. The detour evaluation feature 100 includes a step (Step 134 in FIG. 6) that accepts the user's input and either performs the evaluation of the deviations from the solution route at the displayed location or displays the next location along the solution route at which a deviation can be made. Using the above process, the end user may obtain evaluations for deviations from the solution route at more than one location.

In another alternative, the detour evaluation feature 100 evaluates all the locations within a driver-observable distance along the solution route from which a deviation from the solution route can be made. ("Driver observable" may just what the driver sees down the road through the windshield, or alternatively "driver observable" may mean what the driver observes in terms of radio traffic reports, or programmable message boards on the highway, or road construction.)

C. Replacement of Old Solution Route with New Solution Route

After the end user is presented with an evaluation of deviations from the solution route by the detour evaluation feature 100, the end user may choose to follow one of the deviations instead of continuing on the solution route. If the end user proceeds along a deviation, the navigation programming uses the deviation as a new solution route. The route guidance application 78 would provide the end user with instructions to follow the new solution route to the destination. Thereafter, when the vehicle approaches an intersection and the detour evaluation feature 100 is selected, deviations are determined from the new solution route. If the new solution route crosses the original solution route, a deviation from a new solution route may include resuming travel along the original solution route.

D. Alternative Presentation of Evaluation Results

Figure 8:
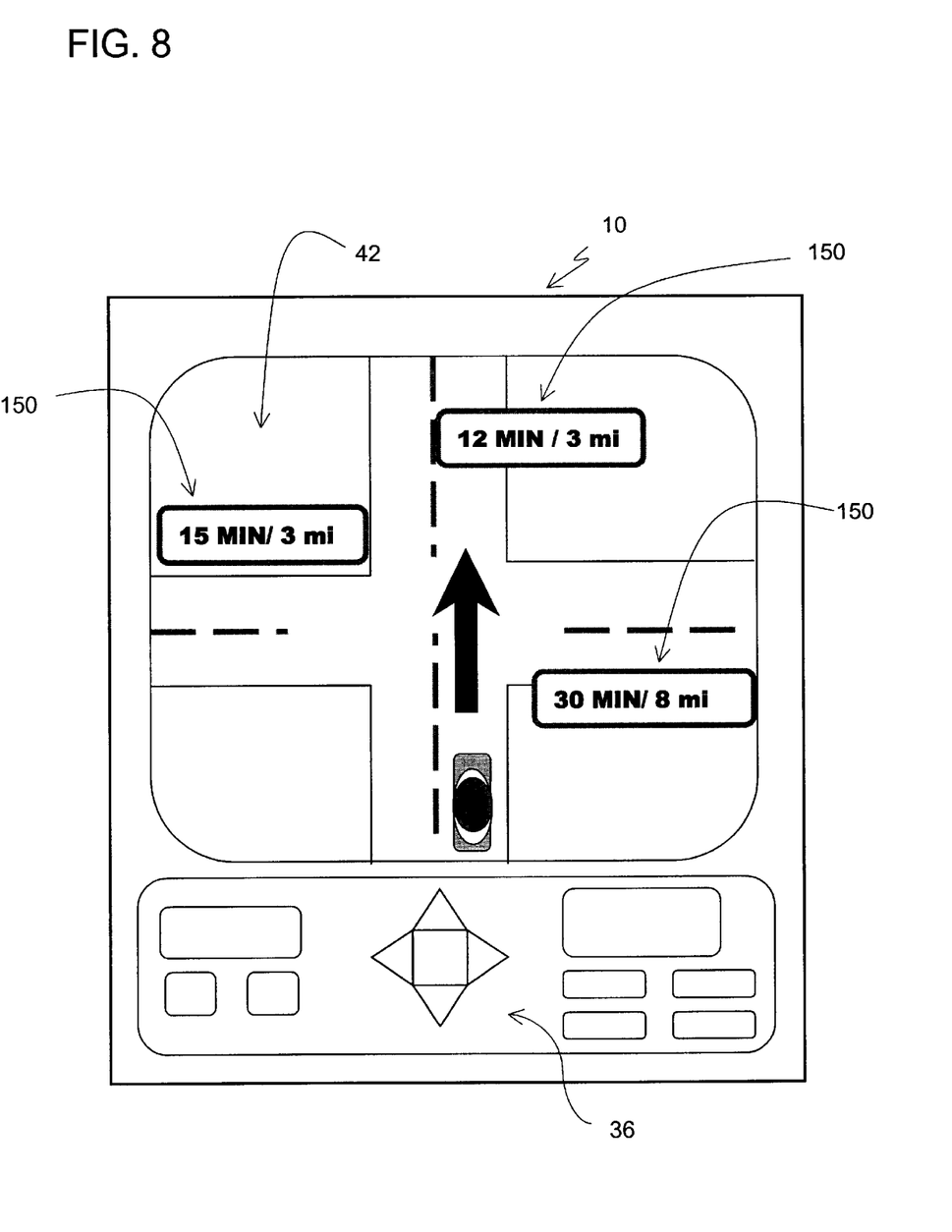
FIG. 8 is an illustration of the display screen of the navigation system of FIG. 2 during operation of an alternative embodiment of the detour evaluation feature of FIG. 3.

In the embodiment described above, the evaluation result provided to the end user by the detour evaluation feature 100 included an indication whether to avoid a deviation at an upcoming location along the solution route. In alternative embodiment, the detour evaluation feature 100 may present different kinds of evaluation results to the end user. One alternative type of evaluation result is shown in FIG. 8. FIG. 8 shows an illustration of the same intersection, INT(1) shown in FIG. 7. In FIG. 8, instead of showing an indication not to make a right turn, the detour evaluation feature 100 provides numeric indications 150 associated with each of the possible legal deviations and the solution route. The numeric indications 150 may provide the expected travel times associated with each of the possible legal deviations and the solution route. The expected travel times may be derived from a relationship that estimates the time of travel from the total cost of travel for each of the possible legal deviations and the solution route. These numeric indications 150 are intended to be only estimates, but they may provide the end user with information about the relative times of travel of each alternative from which a decision can be made whether to follow the solution route or take one of the deviations.

In another alternative embodiment, the numeric indications 150 may indicate the expected times of arrival at the destination.

In another alternative embodiment, the numeric indications 150 may indicate how much longer each deviation is expected to take compared to the solution route.

In another alternative embodiment, the numeric indications 150 may indicate the remaining traveling distance to the destination associated with each of the alternative paths leading from the upcoming intersection. Alternatively, the numeric indications 150 may indicate the incremental traveling distance to the destination associated with each of the alternatives paths.

E. Alternative Modes of Operation

(1). U-turns

In the aforementioned embodiments, detours from the solution route were evaluated at locations at which a departure from the solution route can be made. In an alternative mode of operation, the detour evaluation feature can also take into account U-turns from the present location of the vehicle. Thus, according to this alternative mode of operation, if the detour evaluation feature is selected when a vehicle is approaching an intersection, the deviations that are evaluated would include making a U-turn (provided that a U-turn was possible and/or legal at the current vehicle location), as well as any maneuvers at the intersection. The cost of the U-turn deviation would be determined in the same manner as the costs of the other deviations. Likewise, the detour evaluation feature would provide an evaluation result to the end user about the U-turn deviation in the same way as evaluation results are provided about the other deviations.

Whether the detour evaluation feature 100 evaluates U-turns may be configured by the end user. A menu screen in a setup program may be provided for this purpose.

The U-turn deviation may be used when the vehicle is along a solution route leading up to a railroad grade crossing. When a vehicle is stopped at a railroad grade crossing, the vehicle driver may use the detour evaluation feature, including U-turns, to determine whether to make a U-turn or wait for the train to pass.

(2). Interactive Mode

According to another embodiment, the detour evaluation feature of the navigation system can be operated in an interactive mode. According to this embodiment, the end user does not have the navigation system calculate a single solution route to destination beforehand. Instead, the end user indicates a destination to the navigation system. Then, the driver begins to drive toward the destination. As each intersection is approached (including entrance and exit ramps), the navigation system provides an evaluation of all the legal maneuvers (e.g., including all turns and remaining straight on the road). The evaluation process may be made using the cost of travel associated with each alternative path to the destination from the upcoming intersection being evaluated, as described above. The evaluation result provided to the end user may take any of the forms described above. For example, the navigation system may provide an indication not to make a turn, as illustrated in FIG. 7. Alternatively, the navigation system may provide separate indications of the relative costs of each turn at an upcoming intersection.

When operated in this manner, the driver uses the information provided by the navigation system interactively. The driver may choose to follow any one of the roads leading from the intersection based upon (1) the evaluations provided by the navigation system and (2) his/her own observations of conditions or driving preferences. As mentioned above, the conditions observed may include any kinds of conditions, such as traffic congestion, traffic light status, road conditions, scenic conditions, and so on.

(3). Background Operation

The evaluation functions of the detour evaluation feature 100 may be operated in the background while the vehicle is being driven along the solution route. In this way, when the user selects the detour evaluation feature 100, the evaluation results may be provided to the user very quickly. Whether detour evaluation feature operates in the background may be configured by the end user.

(4). Alternative Modes of Operation

As stated above, the detour evaluation feature may be operated in different modes of operation, including a mode in which each upcoming intersection is evaluated automatically as the vehicle is being driven. In another alternative mode of operation, the detour evaluation feature is configured so that only certain types of upcoming intersections are evaluated automatically. Using a setup menu, the user may select the types of intersections for which the detour evaluation feature operates automatically. For example, the user may configure the detour evaluation feature so that only major intersections or intersections of business roads are evaluated automatically. In another example, the detour evaluation feature may be configured so that it automatically evaluates only intersections with stoplights. In another example, the detour evaluation feature may be configured so that it automatically evaluates only intersections with roads of a selected rank or higher, wherein a rank of a road is related to its functional classification.

In a further example, the detour evaluation feature may be configured to take into account the kind of road on which the vehicle is presently travelling when automatically evaluating upcoming intersections. For example, if the vehicle is on a low ranked road, e.g., a side street, the detour evaluation feature automatically evaluates each upcoming intersection. However, if the vehicle is on a higher ranked road, e.g., a major road artery, only intersections with stoplights are automatically evaluated.

In yet another example, the detour evaluation feature may be configured to take into account the vehicle speed when automatically evaluating upcoming intersections. For example, if the vehicle is traveling below the speed limit, the detour evaluation feature automatically evaluates each upcoming intersection. However, if the vehicle is traveling at or close to the speed limit, only intersections with stoplights are automatically evaluated.

(5). Suppression of Minor Deviation Routes

According to another alternative, when the detour evaluation feature is used to evaluate deviations from a calculated solution route at an indicated location, the deviations may be required to avoid some or all the road segments in the calculated solution route for some or all the remaining distance from the indicated location to the destination. By avoiding road segments in the calculated solution route, the deviation routes are more likely to be substantially different from the solution route. This avoids consideration of deviation routes that represent only minor departures from the solution route, e.g., departures that leave the calculated solution route at the upcoming intersection and then immediately rejoin the solution route at the next intersection. This feature may be configurable by the end user.

(6). User-selection of Route Suppression

According to another alternative, when the detour evaluation feature is used to evaluate deviations from a calculated solution route at an indicated location, the deviations may be required to avoid specific road segments identified by the end user. According to this embodiment, the end user is given a means to identify road segments to avoid. For example, these road segments may include portions of the original solution route. Then, when the deviation evaluation feature is used to evaluate deviations from the solution route, these identified roads segments are not included in any possible deviation routes.

It is intended that the foregoing detailed description be regarded as illustrative rather than limiting and that it is understood that the following claims including all equivalents are intended to define the scope of the invention.

We claim:

1. A method of operation for a navigation system installed in a vehicle, the method comprising the steps of:
   while the vehicle is being driven to a destination, continuously determining a current position of the vehicle; and
   when the vehicle approaches locations at which alternative roads can be taken, advising a driver of the vehicle which of said alternative roads to avoid.

2. The method of claim 1 wherein said step of advising the driver which of said alternative roads to avoid is performed at each intersection from which alternative roads can be taken.

3. The method of claim 1 wherein said step of advising the driver which of said alternative roads to avoid is performed at major intersections from which alternative roads can be taken.

4. The method of claim 1 wherein said step of advising is in response to a query input by the driver to the navigation system.

5. The method of claim 1 further comprising the step of:
   prior to the step of advising, accepting an input from the driver indicating said destination.

6. The method of claim 1 further comprising the step of:
   prior to the step of advising, determining a relative cost to follow a route to the destination along each of said alternative roads; and
   wherein said advising is based upon the relative cost of one of said alternative roads being substantially higher than the others.

7. The method of claim 1 wherein the step of advising is performed only at intersections with stoplights.

8. The method of claim 1 wherein the step of advising is performed only at intersections that meet a criterion specified by the driver.

9. The method of claim 1 wherein the step of advising is performed only at intersections of a specified rank.

10. The method of claim 1 further comprising the step of:
    prior to the step of advising the driver, accepting a configuration parameter from the driver indicating a type of intersection for which advice is to be provided.

11. A method of operation for a navigation system installed in a vehicle, the method comprising the steps of:
    determining a first solution route to a destination specified by a driver of the vehicle;
    providing driving instructions to the driver of the vehicle to drive along the first solution route to the destination;
    while the driver is driving along the first solution route, continuously determining a current position of the vehicle;
    while the driver is driving along the first solution route, providing an evaluation to the driver about whether a departure from the first solution route at a first location should be avoided.

12. The method of claim 11 wherein the evaluation comprises:
    an indication of an expected time of arrival at the destination via the first solution and an expected time of arrival at the destination via an alternative solution route that departs from the first solution route at the first location.

13. The method of claim 11 wherein the evaluation comprises:
    an indication of how much longer an alternative solution route that departs from the first solution route at the first location would be expected to take compared to the first solution route.

14. The method of claim 11 wherein the evaluation comprises:
    an indication that an expected of time of arrival at the destination via an alternative solution route that departs from the first solution route at the first location is not significantly greater an expected time of arrival at the destination via the first solution route.

15. The method of claim 14 wherein the indication is based upon a comparison to a predetermined threshold of a difference between the expected amount of time to arrive at the destination via the alternative route and the expected amount of time to arrive at the destination via the first solution route.

16. The method of claim 15 wherein the predetermined threshold is configurable by the driver.

17. The method of claim 11 wherein the first location is a major intersection immediately ahead of the current position of the vehicle.

18. The method of claim 11 wherein the first location is an intersection specified by the driver.

19. The method of claim 11 further comprising the steps of:
    determining at least one alternative route to the destination, wherein said at least one alternative route departs from the first solution route at the first location; and
    comparing said at least one alternative route to the first solution route to provide said evaluation.

20. The method of claim 19 wherein said at least one alternative route avoids substantially all of the first solution route.

21. The method of claim 11 wherein said departure begins with a U-turn.

22. The method of claim 11 wherein said first location is observable by the driver from the current position of the vehicle.

23. The method of claim 11 wherein the evaluation is provided in response to a query from the driver.

24. The method of claim 23 further comprising the step of:
    prior to receiving the query from the driver, identifying to the driver at least two upcoming intersections along the first solution route from which to select a point of departure from the first solution route; and
    accepting a selection by the driver of one of said intersections as the first location.

25. The method of claim 23 further comprising the steps of:
    prior to receiving the query from the driver, determining at least one alternative route to the destination, wherein said at least one alternative route departs from the first solution route at the first location; and
    comparing said at least one alternative route to the first solution route to provide said evaluation.

26. The method of claim 11 wherein said evaluation is provided automatically as the first location is being approached.

27. The method of claim 26 wherein said evaluation is provided automatically only at intersections with stoplights.

28. The method of claim 26 wherein said evaluation is provided automatically only at intersections that meet a criterion specified by the driver.

29. The method of claim 26 wherein said evaluation is provided automatically only at intersections of a specified rank.

30. A method of operation for a navigation system installed in a vehicle, the method comprising the steps of:

while the vehicle is being driven to a destination, continuously determining a current position of the vehicle; and providing the driver of the vehicle with an evaluation whether any alternative routes from an intersection being approached should be avoided.

31. The method of claim 30 wherein said evaluation is provided in response to a query from the driver.

32. The method of claim 30 wherein said evaluation is provided automatically.

33. The method of claim 32 wherein said evaluation is provided automatically only at intersections with stoplights.

34. The method of claim 32 wherein said evaluation is provided automatically only at intersections that meet a criterion specified by the driver.

35. The method of claim 32 wherein said evaluation is provided automatically only at intersections of a specified rank.

* * * * *